O. F. SAUNDERS.
Panes for Skylights.
No. 141,820. Patented August 12, 1873.
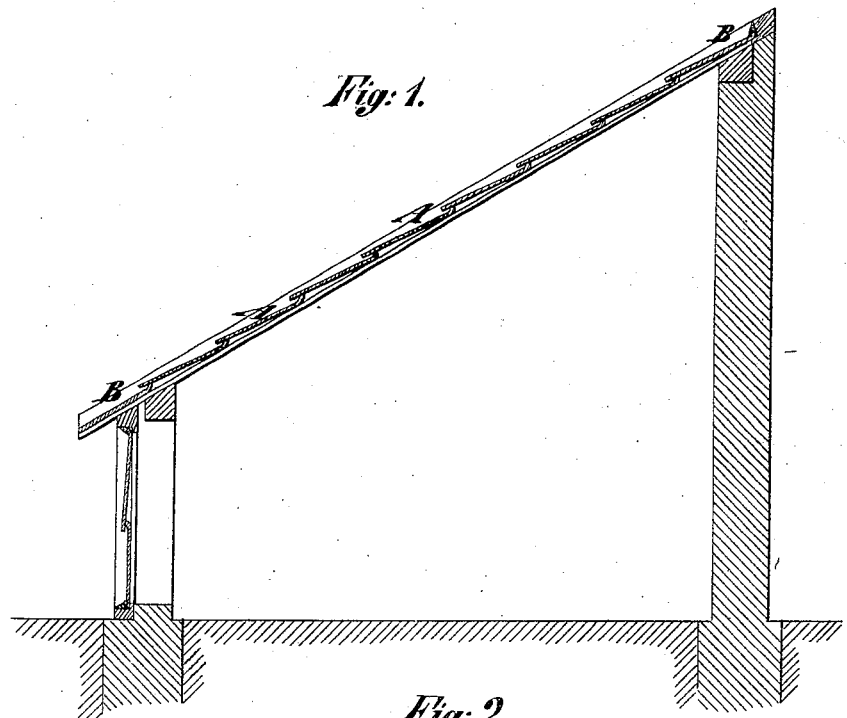
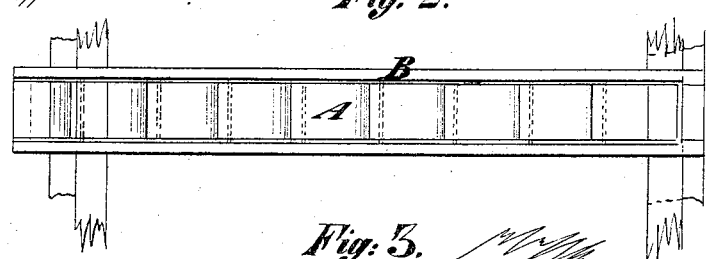
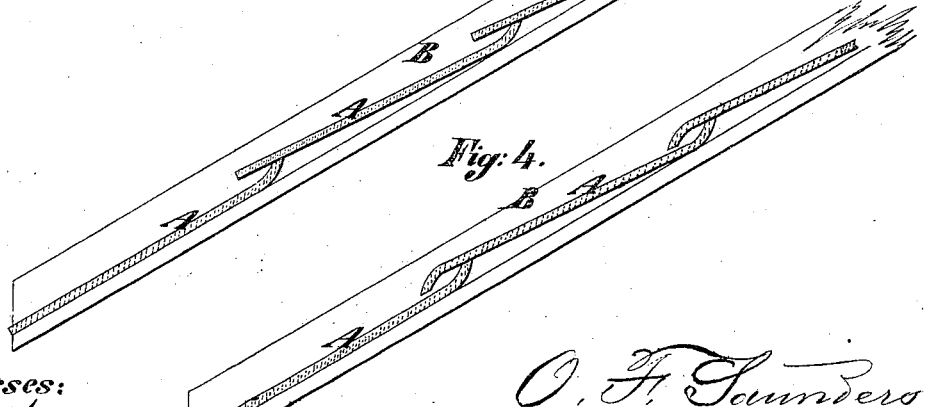

UNITED STATES PATENT OFFICE.

OSCAR F. SAUNDERS, OF CORNING, NEW YORK.

IMPROVEMENT IN PANES FOR SKY-LIGHTS.

Specification forming part of Letters Patent No. 141,820, dated August 12, 1873; application filed March 27, 1873.

*To all whom it may concern:*

Be it known that I, OSCAR F. SAUNDERS, of Corning, in the county of Steuben and State of New York, have invented an Improved Joint for the Glass Panes of Sky-Lights, &c., of which the following is a specification:

The object of this invention is to obtain a tight joint between the panes of glass composing sky-lights, hot-houses, and the like, and, moreover, to counteract the tendency of water to work through the joint by capillary attraction. To this end it consists in making the panes of glass with one or both lapping edges turned over, whereby the water is made to drip rather than run from one plate to another, and is prevented from working through the joint.

In the accompanying drawing, Figure 1 is a transverse section of a hot-house having its panes of glass fitted together according to my invention. Fig. 2 is a top view of a part of the same. Fig. 3 is a section, on a larger scale, of several contiguous panes; and Fig. 4 is a like view, showing a slight modification in the form of the joint.

Similar letters of reference indicate corresponding parts in all the figures.

A A are the panes of glass before mentioned. They are arranged in the usual way, in frames B B, so that the lower edge of each overlaps the upper edge of the next below it. The panes themselves differ very materially from those in ordinary use, for at the upper edge each is turned up so as to fit flush against the bottom of the pane above it. By this means, water running down the hot-house drips from the lower edge of each pane onto the body of the next, and therefore all tendency to work up between the panes is obviated.

In Fig. 4 the panes are shown bent downwardly at the lower edge, so as nearly to reach the bodies of the plates next below them. The water is thus conducted from one plate to another, in such manner as to render it impossible for water to work up through the joint by capillary attraction.

It is almost impossible, with the ordinary panes of glass used for hot-house roofs, to avoid leakage through the joints, because the putty or cement used to form the joint invariably cracks from the inclemency of the weather, and opens the joint; but by my invention this difficulty is obviated, and the cost of fitting the panes of glass together is materially reduced.

What I claim as my invention is—

Panes of glass for hot-houses, sky-lights, and the like, having their meeting edges at one or both ends turned over toward the body of the pane next adjacent, substantially as herein set forth, for the purpose specified.

OSCAR F. SAUNDERS.

Witnesses:
E. D. MILLS,
W. H. CLARK.